(12) United States Patent
Uehara

(10) Patent No.: US 8,837,062 B2
(45) Date of Patent: Sep. 16, 2014

(54) LENS UNIT

(75) Inventor: Toshiyuki Uehara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/549,740

(22) Filed: Jul. 16, 2012

(65) Prior Publication Data

US 2013/0021686 A1    Jan. 24, 2013

(30) Foreign Application Priority Data

Jul. 20, 2011    (JP) .................. 2011-159196

(51) Int. Cl.
| | | |
|---|---|---|
| G02B 7/02 | (2006.01) | |
| G02B 7/10 | (2006.01) | |
| G03B 17/14 | (2006.01) | |

(52) U.S. Cl.
CPC .............. G03B 17/14 (2013.01); G02B 7/102 (2013.01)
USPC ........... 359/827; 359/825; 359/826; 359/828; 359/829; 359/830

(58) Field of Classification Search
USPC .......................... 359/825–830; 396/130, 146
See application file for complete search history.

(56) References Cited

U.S. PATENT DOCUMENTS

| | | | | |
|---|---|---|---|---|
| 4,317,627 | A * | 3/1982 | Isobe et al. .................... | 396/530 |
| 4,344,689 | A | 8/1982 | Kohmoto | |
| 2007/0140686 | A1 * | 6/2007 | Misawa ........................ | 396/535 |

FOREIGN PATENT DOCUMENTS

| | | |
|---|---|---|
| CN | 001928604 A | 3/2007 |
| CN | 101609194 A | 12/2009 |
| JP | 3-231726 A | 10/1991 |
| JP | 10-020176 A | 1/1998 |
| JP | 2010-032891 A | 2/2010 |

* cited by examiner

*Primary Examiner* — Scott J Sugarman
*Assistant Examiner* — Mustak Choudhury
(74) *Attorney, Agent, or Firm* — Canon USA Inc IP Division

(57) ABSTRACT

A lens unit includes an operating member to be operated by a user, an area configured to switch the operating member between an operable state and an inoperable state, and an urging member configured to urge the operation locking member toward the position at which the operating member is brought into the inoperable state.

6 Claims, 4 Drawing Sheets

LENS UNIT

BACKGROUND OF THE INVENTION

1. Field of the Invention

The present invention relates to a lens unit configured to be capable of being coupled with a camera body so as to be removable.

2. Description of the Related Art

In cameras and lens units which allow an interchange of lenses such as single-lens reflex cameras, the following lens units are in practical use as lens units mountable and demountable with respect to camera bodies. That is, lens units having a mechanism for fixing the lens unit and the camera by fitting claws provided at three or four positions on the lens unit side into corresponding portions on the camera side and turning a lens barrel, thereby allowing a lock pin to be intruded at a certain position to fix the lens unit and the camera body are in practical use. (see Japanese Patent Laid-Open No. 3-231726). Also, in low profile zoom lens units that take into account the portability and the storage property of the lens units, the proportion of the length of a zoom ring to the whole length of the lens unit is high. Therefore, user's hand may be put on the zoom ring when mounting and demounting the lens unit with respect to the camera body in many cases. In this case, since the operation to mount and demount the lens unit with respect to the camera body is performed in a state of holding only the zoom ring, there is a case where only the zoom ring is rotated even though an attempt is made to rotate the entire lens unit, so that a problem of a mounting-and-demounting operability may arise. In retractable lens units having a lens barrel which becomes shorter in entire length thereof in a retracted state than in a shooting state, there is less area which may be held by the hand for rotating the entire lens unit when mounting and demounting the lens, so that a problem of a mounting-and-demounting operability may arise.

In order to avoid this problem, a following retractable zoom lens unit as shown below is disclosed in Japanese Patent Laid-Open No. 10-20176. In other words, Japanese Patent Laid-Open No. 10-20176 discloses a configuration in which a rotary resistance of the zoom ring is increased only at the time of mounting and demounting the lens unit with respect to the camera body in the retracted state is increased and the entire lens unit is allowed to rotate without allowing the zoom ring to rotate at the time of mounting and demounting, whereby the operability is improved. Although the zoom ring is exemplified in Japanese Patent Laid-Open No. 10-20176, it is easily understood that this technology may be applied to a focus lens for focusing or rings for other operations.

In the technology of the related art disclosed in Japanese Patent Laid-Open No. 10-20176 described above, a method of increasing a frictional resistance between a fixed cylinder and the zoom ring is employed as a method of increasing the rotary resistance of the zoom ring at the time of mounting and demounting. However, there is a fear that generation of a high frictional force stably causes an anxiety in terms of durability. In addition, there is a high probability that a rotational operating force applied at the time of mounting and demounting of the lens unit with respect to the camera body is instantaneously increased at the time of operation and an operation ring rotates unexpectedly. In addition, the technology which improves the mounting-and-demounting operability of the lens unit with respect to the camera body only when the retracted state may not be applied to the lens unit which is not retractable.

SUMMARY OF THE INVENTION

The present invention has been made in consideration of the above situation, and a thickness reduction of lens units taking into account the portability and the storage property is in progress, a mounting-and-demounting operation of the lens units with respect to a camera body may be performed reliably even when a fixing portion occupies little part and a movable operating member occupies almost the entire length of the lens units, whereby the mounting-and-demounting operability is enhanced.

According to the present invention, provided is a lens unit configured to be demountably mountable on a camera body configured to shoot and record images and provided with a lens configured to image an object image, including: a movable member configured to move by mounting and demounting of the lens unit; an operating member provided on an outer periphery of the lens unit body and configured to be operated by a user; an operation locking member configured to switch the operating member between an operable state and an inoperable state; and an urging member configured to urge the operation locking member, wherein when the lens unit is mounted on the camera body, the movable member moves in a first direction and the operation locking member is released from engagement with the operating member, and the release of the engagement allows the operating member to be movable, so that the operable state is achieved, when the lens unit is demounted from the camera body, if the movable member moves in a second direction opposite the first direction, the operation locking member is moved by the urging member, and this movement and hence is brought into engagement with the operating member, so that the operating member is fixed and is brought into the inoperable state by the engagement.

Further features of the present invention will become apparent from the following description of exemplary embodiments with reference to the attached drawings.

DESCRIPTION OF THE EMBODIMENTS

Preferred embodiments of the present invention will be described in detail in accordance with the accompanying drawings.

A characteristic of the invention is a lens unit including an operating member operated by a user, and an operation locking member configured to switch the operating member between an operable state and an inoperable state, wherein the operating member is brought into the operable state and the inoperable state in conjunction with mounting and demounting of the lens unit with respect to the camera body. On the basis of this thought, the lens unit of the invention has a basic configuration as described in SUMMARY OF THE INVENTION. More specifically, as shown in the embodiments to be described later, the lens unit includes a lock pin groove configured to allow a movable member, which corresponds to a lock pin movable forward and backward in the direction of an optical axis, to be fitted therein, and a mount portion corresponding to a mount portion of the camera body. The operation locking member is movable forward and backward in the direction of the optical axis and includes an operation locking member boss, an urging member urges the operation locking member toward the mount portion, and the operating member includes an operating member groove which allows the operation locking member boss to fit therein. When mounting the lens unit on the camera body, the lock pin is fitted into the lock pin groove and pushes the operation locking member further toward the side opposite the mount portion against the urging force of the urging member, and the operation locking member boss leaves the operating member groove, so that the operating member becomes movable. In contrast, when demounting the lens unit from the camera body, the lock pin leaves the lock pin groove and moves the operation locking member toward the mount portion side in accordance with the urging force of the urging member, and the operation locking member boss is fitted into the operating member groove, so that the operating member is fixed.

Referring now to the attached drawings, preferred embodiment of the invention will be described in detail.

(Embodiment 1)

Figure 1A:
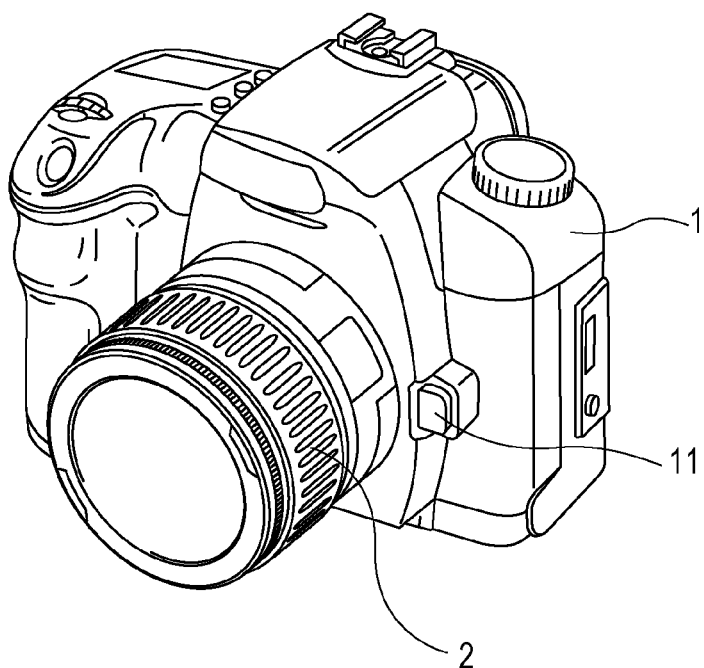
FIG. 1A is a front appearance perspective view of a camera body with a lens unit according to a first embodiment of the invention mounted thereon.

A first embodiment of the invention will be described with reference to FIG. 1 to FIG. 4. As shown in FIG. 1A which illustrates a state in which a lens unit 2 is mounted on a camera body 1 configured to shoot and record images and provided with a movable member which is moved by mounting an demounting of the lens unit, the lens unit 2 which is capable of zooming and focusing is demountably mounted at a center of a front surface of the camera body 1. By pushing a push-button type lens lock release button 11 inward, the mounted lens unit 2 may be removed from the camera body 1. The lens unit 2 has a lens configured to image an object image.

Figure 1B:
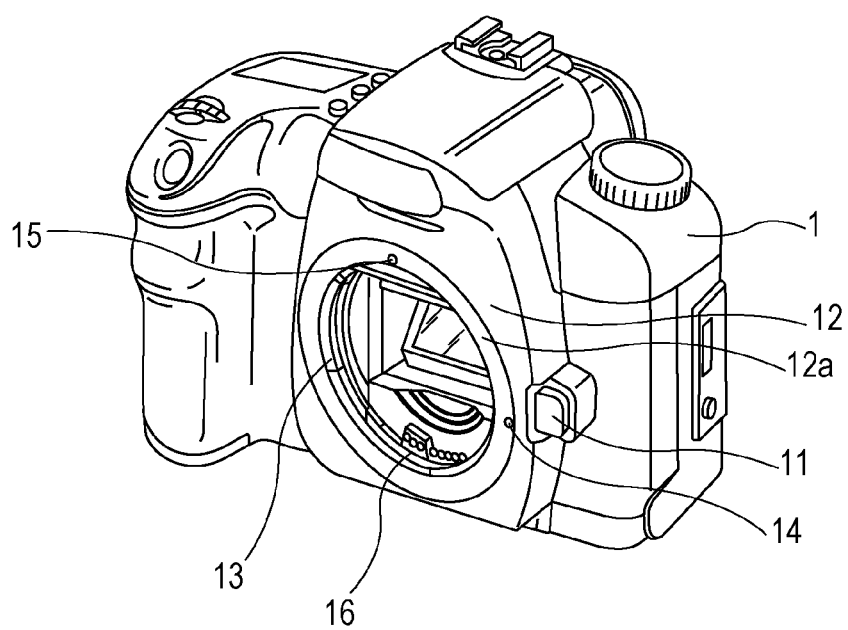
FIG. 1B is a front appearance perspective view of the camera body with the lens unit demounted therefrom.

As shown in FIG. 1B which is a front appearance perspective view of the camera body 1 in a state in which the lens unit 2 is demounted from the camera body 1, the lens unit 2 is demountably fixed to a mount portion 12 of the camera body 1. The mount portion 12 includes a reference plane (mount reference plane) 12a of the camera body 1. Formed at three positions inside the reference plane 12a are bayonet claws 13, which are used as a fixing and positioning device for the lens unit 2 in cooperation with a mount lock pin 14 provided on part of the mount portion 12. A mounting marker 15 is a reference marker used when mounting the lens unit 2 on the camera body 1. A mount contact point 16 is configured to enable communication of a control signal, a state signal, a data signal and the like between the camera body 1 and the lens unit 2, and supply power from the camera body 1 to the lens unit 2.

Figure 2A:
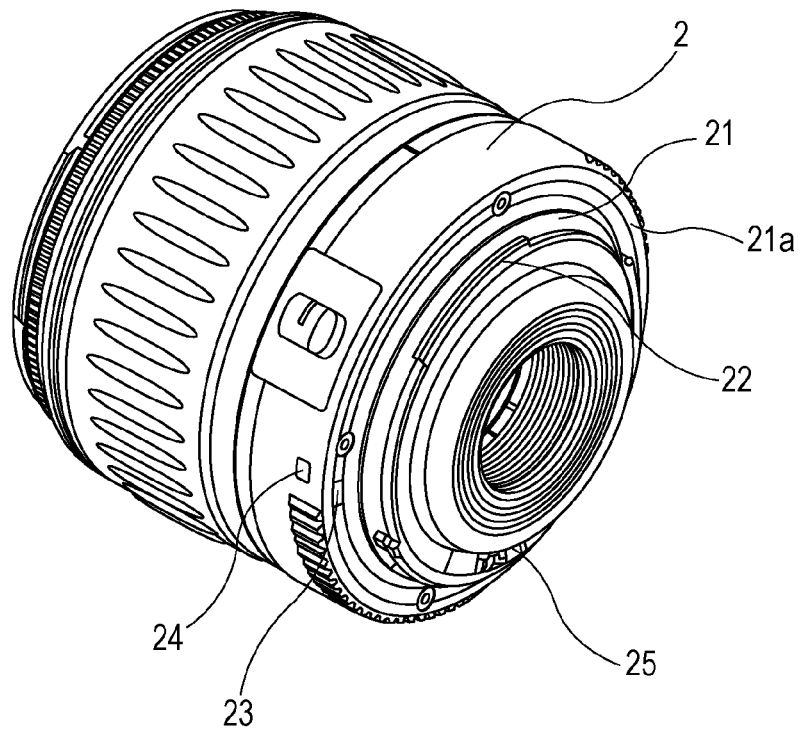
FIG. 2A is an appearance perspective view of a mount portion of the lens unit according to the first embodiment of the invention.

As shown in FIG. 2A which is a perspective view of a mount portion 21 of the lens unit 2 showing a state in which the lens unit 2 is demounted from the camera body 1, the ring-shaped mount portion 21 is mounted on a rear portion of the lens unit 2. A rear end surface of an outermost peripheral portion of the mount portion 21 corresponds to a reference plane (mount reference plane) 21a when being mounted on the camera body 1. The mount portion 21 is formed with bayonet claws 22 at three positions. The bayonet claws 22 are capable of engaging with the bayonet claws 13 provided at the three positions on the mount portion 12 of the camera body 1 when mounting the lens unit 2 on the camera body 1. Accordingly, the reference plane (mount reference plane) 12a of a camera body 1 and the reference plane (mount reference plane) 21a of the lens unit 2 are joined and fixed to each other via the reference planes. At this time, the position of the lens unit 2 in the direction of a horizontal optical axis is fixed with respect to the camera body 1 as well.

The reference plane (mount reference plane) 21a is provided with a lock pin groove 23 for positioning of the camera body 1 and the lens unit 2 in the direction of rotation about the optical axis. A mounting marker 24 is a reference marker used when mounting the lens unit 2 on the camera body 1. A mount contact point 25 is electrically connected to the mount contact point 16 of the camera body 1 as described above.

Figure 2B:
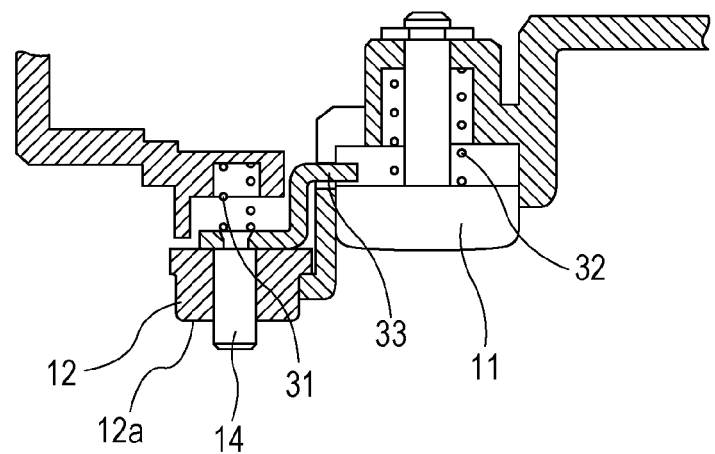
FIG. 2B is a drawing showing a cross-sectional view of a mount lock pin portion for mounting the lens unit on the camera body.

In FIG. 2B, which is a cross-sectional view of a portion of the mount lock pin (movable member) 14 for mounting the lens unit 2 on the camera body 1, the mount lock pin 14 is a pin for positioning the lens unit 2 in the direction of rotation about the optical axis when mounting the lens unit 2. The mount lock pin 14 is inserted into the lock pin groove 23 of the lens unit 2 by an urging force of a spring 31 when the angular position thereof is aligned with the angular position of the lock pin groove 23 of the lens unit 2, so that a rotation lock of the lens unit 2 is achieved. The lens lock release button 11 is a button for cancelling the rotation lock. When the lens lock release button 11 is pushed inward against the urging force of a spring 32, a lock lever 33 coupled to the lens lock release button 11 is moved, and the mount lock pin 14 as a member integral with the lock lever 33 is retracted from the reference plane (mount reference plane) 21a toward the camera body 1. In this manner, the rotation lock for fixing the lens unit 2 to the camera body 1 is released.

Mounting and demounting operations of the camera body 1 and the lens unit 2 configured as described above will be described. Mounting of the lens unit 2 on the camera body 1 is achieved by aligning mounting markers 15 and 24 thereof with respect to each other and bringing the bayonet claws 13 of the camera body 1 and the bayonet claws 22 of the lens unit 2 into engagement. Accordingly, the reference plane (mount reference plane) 12a of the camera body 1 and the reference plane (mount reference plane) 21a of the lens unit 2 are joined and fixed to each other via the reference planes. When the lens unit 2 is rotated about the optical axis, the angular positions of the mount lock pin 14 of the camera body 1 and the lock pin groove 23 of the lens unit 2 are aligned. At this time, by the urging force of the spring 31, the mount lock pin 14 of the camera body 1 enters the lock pin groove 23 of the lens unit 2, so that the rotation lock in the direction of rotation about the optical axis is achieved. With this procedure, the mounting is completed.

Subsequently, demounting of the lens unit 2 from the camera body 1 is achieved by pushing the lens lock release button 11 inward against the urging forces of the springs 31 and 32 to cause the mount lock pin 14 to retract from the lock pin groove 23 of the lens unit 2 toward the camera body 1 side. Accordingly, the rotation lock of the lens unit 2 in the direction of rotation about the optical axis is released. When the lens unit 2 is rotated about the optical axis, engagement between the bayonet claws 13 of the camera body 1 and the bayonet claws 22 of the lens unit 2 are released. Accordingly, the demounting of the lens unit 2 is completed.

Figure 3A:
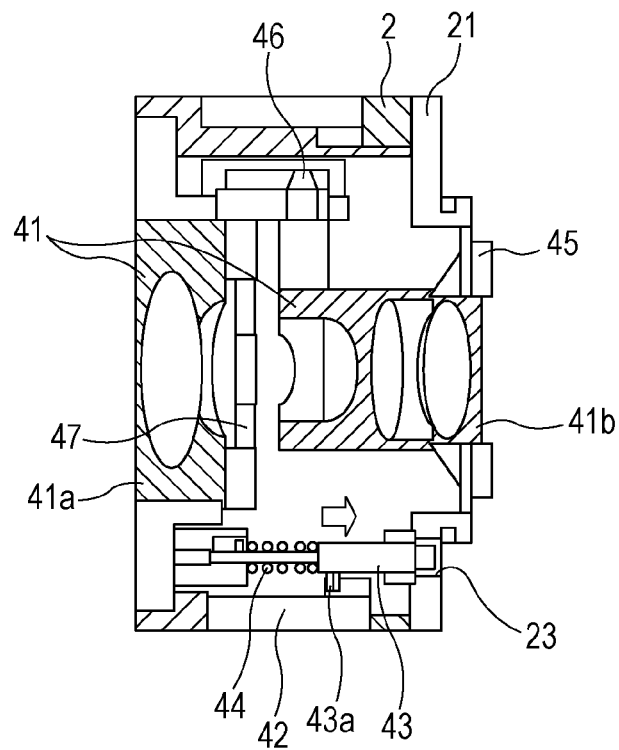
FIG. 3A is a cross-sectional side view of the lens unit when an operating member is locked.
Figure 3B:
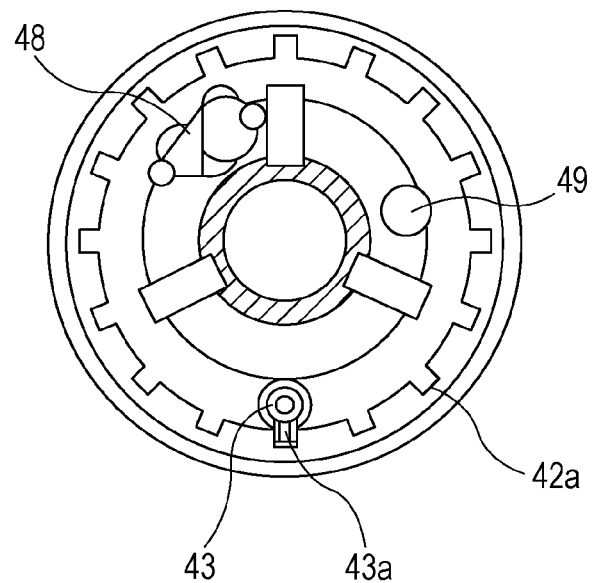
FIG. 3B is a drawing showing a structure of an interior of a rear portion of the lens unit in FIG. 3A.
Figure 4:
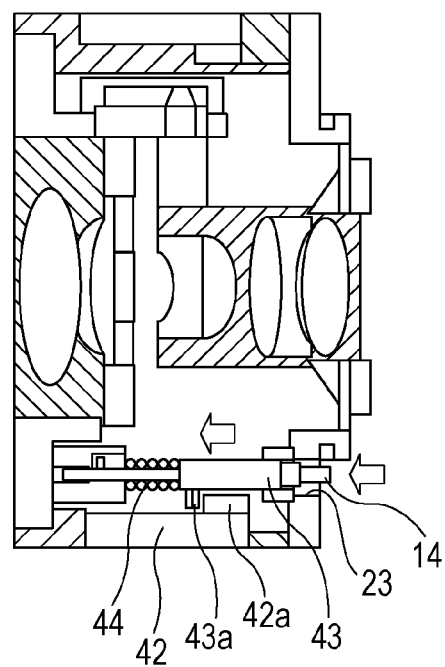
FIG. 4 is a side cross-sectional view of the lens unit when the operating member is unlocked.

A configuration of characteristic portions of the invention will be described with reference to FIGS. 3A and 3B, and FIG. 4. FIG. 3A is a cross-sectional side view of the lens unit 2 when an operating member 42 to be operated by a user provided on an outer periphery of the lens unit body is locked. FIG. 3B is a drawing viewed from the back when the operating member 42 is locked, and the mount portion 21 and a mount cap 45 are not illustrated for the convenience of description. FIG. 4 is a cross-sectional side view of the lens unit 2 when the operating member 42 is unlocked. An optical lens 41 is arranged at a center portion of the lens unit 2. Although a front group lens 41a of the optical lens 41 is fixed, while a rear group lens 41b has a structure which may be extended for focusing. An extending motion of the rear group lens 41b is performed by a cam structure 46 and a focus unit 48, which is a drive source of the cam structure 46. An aperture unit 47 is arranged between the front group lens 41a and the rear group lens 41b, and the focusing operation is performed by an aperture motor 49 as a drive source of the aperture unit 47.

Here, the operating member 42 corresponds to a manual focus ring, and is configured to be rotated in a manual mode for focusing of the optical lens 41. The operating member 42 corresponds to an electronic ring, and is configured not to have a stroke end in the direction of rotation and be infinitively rotatable. An operation locking member 43 configured to fix the rotation of the operating member 42 is located at a position to be fitted into the lock pin groove 23 of the mount portion 21. A spring 44, which corresponds to an urging member, is arranged on an end portion of an axle of the operation locking member 43. The operation locking member 43 is positioned and supported so as to be movable in the direction of the optical axis of the lens unit 2, and is pushed toward the mount portion 21 by the urging force of the spring 44. An operation locking member boss 43a having a tapered shape toward the mount portion 21 is arranged at a center option of the operation locking member 43. As illustrated in FIG. 3B, a plurality of operating member grooves 42a directed toward the inner diameter are arranged on the side of the mount portion 21 of the operating member 42. The plurality of operating member grooves 42a are formed to have a shape which allows the operation locking member boss 43a to be fitted therein.

On the basis of the configurations described above, a characteristic action when mounting and demounting the lens unit 2 with respect to the camera body 1 according to the invention will be described. Before mounting the lens unit 2 on the camera body 1, the lens unit is in the state illustrated in FIG. 3A, and the operating member 42 is not rotatable with respect to the lens unit 2. In this state, the operation locking member 43 is pushed toward the mount portion 21 by an urging force of the spring 44, the operation locking member boss 43a is fitted into the operating member groove 42a, and the operating member 42 is fixed so as not to rotate. Accordingly, the lens unit 2 is reliably rotated. Here, the lock pin groove 23 has a hole on the bottom thereof, and part of the operation locking member 43 is fitted into the hole through the bottom.

Here, the reference plane 12a of the camera body 1 and the reference plane 21a of the lens unit 2 are aligned, and the lens unit 2 is rotated to a position where the lock pin groove 23 of the lens unit 2 is aligned with the mount lock pin 14 of the camera body 1. At this time, the mount lock pin 14 projects from the reference plane (mount reference plane) 12a of the camera body 1 by moving in the first direction by the urging force of the spring 31, then enters the lock pin groove 23, and abuts against part of the operation locking member 43. Here, the urging force of the spring 31 is set to be larger than the urging force of the spring 44. Therefore, as in FIG. 4, the mount lock pin 14 pushes the operation locking member 43, and hence the operation locking member boss 43a leaves the operating member groove 42a, so that the operating member 42 is rotatable with respect to the lens unit body.

Subsequently, an action of demounting the lens unit 2 from the camera body 1 will be described. When the user pushes the lens lock release button 11 inward, the mount lock pin 14 moves in the second direction opposite the first direction, and is retracted to the side of the camera body 1. The operation locking member 43 pushed by the mount lock pin 14 inward is pushed toward the mount portion 21 side by an urging force of the spring 44. At this time, when the angular position of the operating member groove 42a is aligned with the position of the operation locking member boss 43a, the operation locking member boss 43a fits into the operating member groove 42a. In contrast, when the angular position of the operating member groove 42a is deviated from the position of the operation locking member boss 43a, the operation locking member boss 43a does fit into the operating member groove 42a immediately. However, when the user holds the operating member 42 and starts rotating, the operation locking member boss 43a fits into the operating member groove 42a at a moment when the angular position of the operating member 42 is aligned with the angular position of the operating member groove 42a. In this manner, since a plurality of the operating member grooves 42a are provided on the entire circumference of the inner side of the operating member, the operation locking member boss 43a fits into any one of the plurality of operating member grooves 42a. From then onward, the operating member 42 is unified with the main body of the lens unit 2. With this integration, even when the user holds only the operating member 42, the lens unit 2 can be demounted easily from the camera body 1 by rotating the lens unit 2.

In other words, when mounting and demounting the lens unit 2 with respect to the camera body 1, the operating member 42 is fixed so as not to rotate, and hence mounting and demounting operations of the lens unit 2 by rotating the same are reliably achieved. When the lens unit 2 is mounted on the camera body 1, the operating member 42 is allowed to rotate with respect to the main body of the lens unit 2 so as to be used as a manual focus ring. Accordingly, even when a portion fixed during mounting-and-demounting operation occupies little part due to reduction of the thickness of the lens unit 2, and hence the length of the rotatable operating member 42 occupies almost the entire length of the lens unit 2, the operating member 42 is fixed when mounting and demounting the lens unit 2 with respect to the camera body 1 and the mounting and demounting operation is reliably performed. In this configuration, the mounting-and-demounting operability is improved.

Although the preferred embodiments of the invention have been described thus far, the invention is not limited thereto. For example, the invention may be used in a retractable lens barrel which is configured to be reduced in the entire length of the lens unit in a state not for shooting in contrast to the shooting state by retraction. In other words, various modifications and alterations may be made within the scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-159196, filed on Jul. 20, 2011 which is hereby incorporated by reference herein in its entirety.

What is claimed is:

1. A lens unit configured to be demountably mountable on a camera body configured to shoot and record images and provided with a lens configured to image an object image, comprising:
    a movable member configured to move by mounting and demounting of the lens unit;
    an operating member provided on an outer periphery of the lens unit body and configured to be operated by a user;
    an operation locking member configured to switch the operating member between an operable state and an inoperable state; and
    an urging member configured to urge the operation locking member in a second direction,
    wherein when the lens unit is mounted on the camera body, the movable member moves in a first direction and the operation locking member, also moving in the first direction, is released from engagement with the operating member, and the release of the engagement allows the operating member to be movable, so that the operable state is achieved,
    when the lens unit is demounted from the camera body, if the movable member moves in a second direction opposite the first direction, the operation locking member is moved in the second direction by the urging member, and this movement and hence the operating locking member is brought into engagement with the operating member, so that the operating member is fixed and is brought into the inoperable state by the engagement,
    wherein a plurality of the operating member grooves are provided on the entire circumference of the inner side of the operating member and, when the lens unit is demounted from the camera body, the operation locking member boss is fitted into any one of the plurality of operating member grooves.

2. The lens unit according to claim 1, further comprising:
    a lock pin groove configured to allow the movable member, which is a lock pin that moves forward and backward in the direction of an optical axis, to be fitted therein, and
    a mount portion corresponding to a mount portion of the camera body,
    wherein the operation locking member is movable forward and backward in the direction of the optical axis and includes an operation locking member boss, the urging member urges the operation locking member toward the mount portion.

3. The lens unit according to claim 2, wherein the operating member includes an operating member groove which allows the operation locking member boss to be fitted therein.

4. The lens unit according to claim 3, wherein when the lens unit is mounted on the camera body, the lock pin is fitted into the lock pin groove and pushes the operation locking member further toward the side opposite the mount portion against an urging force of the urging member, and the operation locking member boss fitted into the operating member groove leaves therefrom, so that the operating member becomes movable.

5. The lens unit according to claim 3, wherein when the lens unit is demounted from the camera body, the lock pin leaves the lock pin groove and further moves the operation locking member toward the mount portion in accordance with the urging force of the urging member, and the operation locking member boss is fitted into the operating member groove, so that the operating member is fixed.

6. The lens unit according to claim 2, wherein the lock pin groove has a hole at a bottom, when the lens unit is demounted from the camera body, part of the operation locking member passes through the bottom and is fitted into the hole, and when the lens unit is mounted on the camera body, the lock pin pushes part of the operation locking member.

* * * * *